US010647520B2

(12) United States Patent
Hartmann et al.

(10) Patent No.: US 10,647,520 B2
(45) Date of Patent: May 12, 2020

(54) ACTUATING CONVEYOR

(71) Applicants: Bernd Hartmann, Grafschaft-Leimersdorf (DE); Ali Özyigit, Bonn (DE); Kai-Ulrich Ventz, Hildesheim (DE); René Schällig, Hildesheim (DE)

(72) Inventors: Bernd Hartmann, Grafschaft-Leimersdorf (DE); Ali Özyigit, Bonn (DE); Kai-Ulrich Ventz, Hildesheim (DE); René Schällig, Hildesheim (DE)

(73) Assignees: Deutsche Post AG, Bonn (DE); Transnorm System GmbH, Harsum (DE)

( * ) Notice: Subject to any disclaimer, the term of this patent is extended or adjusted under 35 U.S.C. 154(b) by 104 days.

(21) Appl. No.: 15/622,784

(22) Filed: Jun. 14, 2017

(65) Prior Publication Data

US 2017/0362036 A1 Dec. 21, 2017

(30) Foreign Application Priority Data

Jun. 17, 2016 (DE) .......................... 10 2016 111 110

(51) Int. Cl.
*B65G 43/08* (2006.01)
*G05B 19/418* (2006.01)
(Continued)

(52) U.S. Cl.
CPC ............. *B65G 43/08* (2013.01); *B65G 43/10* (2013.01); *B65G 47/31* (2013.01); *G05B 19/418* (2013.01);
(Continued)

(58) Field of Classification Search
CPC ...... G05B 19/418; B65G 43/10; B65G 47/31; B65G 43/08; B65G 2203/04;
(Continued)

(56) References Cited

U.S. PATENT DOCUMENTS 6,471,044 B1 * 10/2002 Isaacs .................... B65G 43/08
198/347.4
6,484,886 B1 * 11/2002 Isaacs .................... B65G 43/08
198/368
(Continued)

FOREIGN PATENT DOCUMENTS

DE           36 16 023 A1    11/1987
DE    10 2014 224 147 A1     6/2016
(Continued)

OTHER PUBLICATIONS

Hassan K. Khalil, "Nonlinear Systems," 1996, 46 pages, 2nd edition, ISBN 0132280248, Section 10.1.3, Prentice-Hall, Inc., Upper Saddle River, New Jersey.

*Primary Examiner* — Mark A Deuble
(74) *Attorney, Agent, or Firm* — Reinart Boerner Van Deuren P.C.

(57) ABSTRACT

The invention relates to a method which comprises determining first geometry information of a first object stream of a plurality of objects, which are transported on a first conveyor. The method also comprises determining second geometry information of a second object stream of a plurality of objects which are transported on a second conveyor. The first conveyor is configured to transport objects at a first speed, and the second conveyor is configured to transport objects at a second speed. The first conveyor and the second conveyor are arranged in such a way that the objects which are transported by the first conveyor move onto the second conveyor. The method also comprises adjusting the first speed of the first conveyor and/or adjusting the second speed (Continued)

of the second conveyor on the basis of the determined first geometry information and/or the determined second geometry information.

24 Claims, 3 Drawing Sheets

(51) Int. Cl.
    *B65G 43/10*     (2006.01)
    *B65G 47/31*     (2006.01)

(52) U.S. Cl.
    CPC .. *B65G 2201/0285* (2013.01); *B65G 2203/04* (2013.01); *B65G 2811/0615* (2013.01); *B65G 2811/0631* (2013.01)

(58) Field of Classification Search
    CPC .... B65G 2201/0285; B65G 2811/0631; B65G 2811/0615
    See application file for complete search history.

(56) References Cited

U.S. PATENT DOCUMENTS

| | | | |
|---|---|---|---|
| 2001/0035332 A1 | 11/2001 | Zeitler | |
| 2003/0141165 A1* | 7/2003 | Reznik | B65G 1/0478 |
| | | | 198/434 |
| 2004/0104100 A1* | 6/2004 | Schiesser | B65G 15/22 |
| | | | 198/460.1 |
| 2007/0246328 A1* | 10/2007 | Reznik | B65G 43/10 |
| | | | 198/444 |
| 2016/0221762 A1* | 8/2016 | Schroader | B65G 43/08 |
| 2018/0081346 A1* | 3/2018 | Dwivedi | B65G 59/066 |
| 2018/0312343 A1* | 11/2018 | Hellenbrand | B65G 47/917 |

FOREIGN PATENT DOCUMENTS

| | | |
|---|---|---|
| EP | 0 174 168 A1 | 3/1986 |
| EP | 0 245 806 A2 | 11/1987 |
| EP | 3 020 660 A1 | 5/2016 |
| WO | WO 00/66280 A2 | 11/2000 |
| WO | WO 2016/082950 A1 | 6/2016 |
| WO | WO 2016/108937 A1 | 7/2016 |

* cited by examiner

300

301 Determining first geometry information comprising a height profile of a first object stream of a plurality of objects which are transported on a first conveyor 302 Adjusting the first speed of the first conveyor and/or adjusting the second speed of a second conveyor on the basis of the first geometry information 303 Movement of the objects onto the second conveyor 304 Determining second geometry information comprising a height profile of a second object stream of a plurality of objects which are transported on the second conveyor 305 Adjusting the first speed of the first conveyor and/or adjusting the second speed of the second conveyor on the basis of the first and the second geometry information

Fig. 3

ACTUATING CONVEYOR

CROSS-REFERENCE TO RELATED PATENT APPLICATION

This patent application claims priority to German Application No. 10 2016 111 110.4, filed Jun. 17, 2016, the entire teachings and disclosure of which are incorporated herein by reference thereto.

FIELD OF THE INVENTION

The present invention relates to a method which can be used, in particular, for actuating conveyor. In addition, the invention relates to an apparatus and to a computer program for such a method, and to a system in which such a method is implemented.

BACKGROUND OF THE INVENTION

Conveyor systems having conveyor such as, for example, conveyor belts are known from practice for a plurality of fields of use. Conveyor systems can be provided, for example, for transporting objects such as piece goods in an automated fashion and at the same time, for example, separating them. The separated piece goods can subsequently be sorted, fed to further conveyor belts and/or placed in a rolling container. Piece goods may be here, for example, packages such as parcels or letters, but can also be other objects such as non-packaged goods or intermediate products.

Packaged items can be transported in terms of logistics in vehicles as bulk goods and stored in parts of a conveyor system as bulk goods. Modern methods of unloading technology also permit efficient unloading of interchangeable containers with packaged items in such a way that packaged items can be fed to the conveyor equipment as bulk goods. In terms of logistics, bulk goods can be essentially classified here into three classes: 3D bulk, 2D bulk and 1D bulk. In the case of 3D bulk, packaged items lie one on the other or one under the other, one next to the other and one in front of the other or one behind the other in an unordered sequence. In the case of 2D bulk, packaged items lie one next to the other and one in front of the other or one behind the other in an unordered sequence but not one on the other or one under the other. In the case of 1D bulk, packaged items lie one behind the other in an unordered sequence but not one next to the other or one under the other or one on the other. Packaged items lie one behind the other, in particular, precisely when essentially two packaged items are congruent when viewed from the side (at a right angle to the conveying direction). In this context, the distance between the packaged items is not significant. Moreover, packaged items are considered, in particular, to be separated if they are arranged with an intermediate distance greater than zero in the 1D bulk or 2D bulk.

In many conveyor systems, the transportation takes place firstly as 3D bulk or as 2D bulk. However, in most areas of conveyor systems, the transportation of packaged items takes place as a stream of piece goods, that is to say as 1D bulk, since this is the only way that the individual package can be fed to its end point in the system.

It is problematic here that the packaged items are as a rule to be introduced into the conveyor system as 3D bulk and then have to be subjected to a separation process (singulation) in order to firstly generate 2D bulk from the 3D bulk and finally generate 1D bulk. There is a need to optimize this process as much as possible in order to achieve a high throughput rate of packaged items. This can be comparatively costly and depend on a large number of factors which, however, cannot also be predicted. For example, packaged items of a wide variety of sizes in a wide variety of arrangements and sequences may be present in the 3D bulk.

BRIEF SUMMARY OF A NUMBER OF EXEMPLARY EMBODIMENTS OF THE INVENTION

One of the objects of the invention is to permit particularly efficient use of a conveyor system and, in particular, to optimize the throughput rate.

The object is achieved by means of a method, an apparatus, a system, and a computer program defined herein. Exemplary embodiments are defined in the independent claims as originally filed. Advantageous refinements can be found in the dependent claims as originally filed.

An exemplary embodiment of a method according to the invention comprises determining first geometry information of a first object stream of a plurality of objects, which are transported on a first conveyor. The method also comprises determining second geometry information of a second object stream of a plurality of objects which are transported on a second conveyor. The first conveyor is configured to transport objects at a first speed, and the second conveyor is configured to transport objects at a second speed. The first conveyor and the second conveyor are arranged in such a way that the objects which are transported by the first conveyor move onto the second conveyor. The method also comprises adjusting the first speed of the first conveyor and/or adjusting the second speed of the second conveyor on the basis of the determined first geometry information and/or the determined second geometry information.

An exemplary embodiment of an apparatus according to the invention comprises means for causing the apparatus or a system to perform any desired embodiment of the method according to the invention. The means can comprise, for example, at least one memory with program instructions and at least one processor. The at least one processor can be configured to perform program instructions from the at least one memory. The program instructions can be configured to cause the apparatus or the system to implement any desired embodiment of the method according to the invention when they are performed by the at least one processor. The memory can be a volatile or non-volatile memory. The memory can be integrated into the apparatus in an interchangeable or fixed fashion. The apparatus can comprise any desired further components. Of course, the means can alternatively also be realized at least partially by means of circuit equipment.

The apparatus according to the invention can be, for example, a control apparatus in the form of an open-loop or closed-loop control apparatus or can comprise such an apparatus. Such an apparatus may be, for example, a computer, for instance an industrial PC, or a server or can comprise such an apparatus. The apparatus according to the invention can likewise be a module for any desired control apparatus or can comprise such a module.

An exemplary embodiment of a system according to the invention comprises any desired embodiment of an apparatus according to the invention, the first conveyor and the second conveyor, and capture device arranged for capturing the first and/or the second geometry information. The system can comprise any desired further elements.

An exemplary embodiment of a computer program according to the invention comprises program instructions which are configured to cause an apparatus or a system to implement any desired embodiment of the method according to the invention when they are performed by at least one processor.

The computer program can be stored in a physical computer-readable medium, for example in a volatile or non-volatile program memory of an apparatus or on a computer chip or a memory stick. However, it can also be transmitted via the Internet and/or via wire-bound lines.

It has become apparent that the described determining of first and second geometry information and the use of the determined first and second geometry information to adjust the speed permit the throughput rate of the conveyor system to be increased and/or to be adjusted as a function of a desired throughput rate of a conveyor system. In this context, use is made of the fact that information about each individual object of an object stream does not necessarily have to be determined but instead geometry information of the object stream which comprises the objects has to be determined. Finally, by virtue of the fact that geometry information is used to adjust the speed of the conveyor before and after the transfer from the first to the second conveyor, a desired distribution of the objects in the second object stream can be achieved efficiently.

It has become apparent, in particular, that by means of the method excessively large and excessively small gaps or distances between the objects of the second object stream can be avoided, which contributes to increasing the throughput rate.

The respective geometry information is determined, for example, using capture device. The capture device can basically be selected as desired insofar as they are suitable for acquiring the respective geometry information or information from which the respective geometry information can be determined. The capture device advantageously comprise, for example, laser-based sensors (LMS), Time-of-Flight sensors (TIM sensors) and/or image-based sensors, to name only a few examples. The capture device can also comprise further sensors and/or be configured to determine further information.

For example, the respective geometry information comprises surface information and/or height information of the respective object stream. The respective geometry information comprises, for example, information which is representative of a surface characteristic of the respective object stream. For example, the respective geometry information comprises information which is representative of a surface structure of the surface. For example, the respective geometry information comprises information which is representative of a geometric property of the surface, for example the size of the respective surface.

While, in particular in the case of the first object stream in which the objects are present, for example, as 3D bulk, geometry information can describe merely the object stream itself, for example in the case of the second object stream in which the objects are already present, for example, as separated objects in 2D bulk, geometry information can also describe individual objects of the object stream.

The respective geometry information is preferably acquired over a (predetermined) time period in which the objects of the respective object stream continue to move. The respective geometry information is acquired, for example, in each case in one or more specific spatial sections or segments of the respective object stream.

The fact that the objects move from the first conveyor onto the second conveyor is understood, in particular, as meaning that the objects (inter alia) move under the effect of gravity from the first to the second conveyor. For example, the objects can tip or slide from the first conveyor onto the second conveyor. For example, the objects drop from the first conveyor to the second conveyor. In the process, the objects can be (briefly) in freefall.

For example, the first and the second conveyor are part of a conveyor system which can, in particular, also have further conveyor.

The adjustment of the respective speed can take place using suitable actuator. The respective speed can therefore be regulated on the basis of the reaction of the adjusted speed on the respective object stream.

In one exemplary embodiment, the described method is or comprises an adaptive regulating process for the adjustment of the first and/or second speeds. The respective conveyor can therefore be actuated efficiently by means of an adaptive regulating process.

For example, the first speed is adjusted on the basis of the first and/or second geometry information (only or at least on said basis), for example in order to adjust the supply of objects from the first object stream into the second object stream. For example, the second speed is adjusted on the basis of the first and/or second geometry information (only or at least on said basis), for example in order to adjust the leading away of objects in the second object stream. Preferably, both the first and the second speeds are adjusted on the basis of first and/or second geometry information. In particular, the difference and/or the ratio between the first and the second speeds can be adjusted. The difference or the ratio of the first speed with respect to the second speed can be adapted dynamically. The difference or the ratio of the first speed with respect to the second speed can, however, preferably remain substantially constant. In this case, both the first and second speeds are then adjusted. For example, the difference or the ratio of the first speed with respect to the second speed is valid within an $\epsilon$ environment (epsilon environment). Within this environment, the algorithm for adjusting the first and/or second speeds is stable according to Ljapunow. The basic principle of stability according to Ljapunow within an $\epsilon$ environment is known to a person skilled in the art in the field of regulating process technology such as, for example, from the specialist book "Nonlinear Systems", Hassan K. Khalil, 2nd edition, Prentice-Hall, ISBN 0132280248, section 10.1.3, wherein the disclosure of this section is also explicitly incorporated in this application through reference ("incorporation by reference").

If the first and/or second speeds are adjusted merely on the basis of one type of geometry information (for example the first type of geometry information), the other type of geometry information (for example the second type of geometry information) which is determined can then advantageously be used to check the adjustment, for example by checking whether an expected distribution of the objects occurs in the second object stream.

Within the scope of this application, the fact that something takes place on the basis of something or that something is based on something is to be understood as meaning that it takes place at least partially on the basis thereof or is based at least partially thereon.

In one exemplary embodiment, the first conveyor is configured to transport the objects of the first object stream to one end of the first conveyor, and the objects move onto the second conveyor at the end of the first conveyor. The first and the second conveyor can be arranged one behind the other to form a step, for example.

In one exemplary embodiment, the first object stream comprises objects which are transported at least partially one on the other and/or one next to the other on the first conveyor. The objects of the first object stream are preferably transported one on the other and one next to the other on the first conveyor (3D bulk). For example, the first object stream is in the form of what is referred to as a width-height bulk, that is to say an object stream which is essentially rectangular in cross section. For example, the first object stream is in the form of what is referred to as a width-heaped bulk, that is to say a bulk which becomes essentially narrower in cross section toward the top. However, it is basically also conceivable for the objects of the first object stream to be transported merely one on the other and one behind the other but essentially not next to one another, on the first conveyor. For example, the first object stream is then in the form of what is referred to as a narrow-heaped bulk. The objects of heaped bulks can be separated efficiently by the described method, even without having to determine geometry information of individual objects of the bulk.

In one exemplary embodiment, the first conveyor and the second conveyor are arranged in such a way that objects which are transported one on the other in the first object stream on the first conveyor can be distributed by the movement onto the second conveyor in such a way that these objects which were previously transported one on the other in the first object stream are at least partially no longer transported one on the other in the second object stream on the second conveyor. The objects are preferably distributed in such a way that none of the objects which were previously transported one on the other in the first object stream are transported one on the other any more in the second object stream on the second conveyor.

In one exemplary embodiment, in the second object stream the objects are transported essentially one next to the other and/or one behind the other on the second conveyor. The objects in the second object stream are preferably transported one next to the other and one behind the other on the second conveyor (2D bulk). For example, the second object stream is in the form of what is referred to as a wide-area bulk in which objects are preferably separated, that is to say spaced apart. Subsequent to this, the objects are preferably transferred into 1D bulk. It is, however, also conceivable for the objects in the second object stream to be already transported exclusively one behind the other on the second conveyor.

In one exemplary embodiment, the first geometry information comprises first surface information which is, in particular, representative of a size of the surface of the first object stream, and/or the second geometry information comprises second surface information which is, in particular, representative of a size of the surface of the second object stream. For example, the first and/or second surface information is or comprises the surface of the respective object stream. In this context, for example, the surface of a specific section or segment of the object stream is determined.

In one exemplary embodiment, the first geometry information comprises first extent information of the first object stream and/or the second geometry information comprises second extent information of the second object stream. The extent information relates, in particular, to an extent of the respective object stream transversely with respect to the particular object stream. For example, the extent information is representative of the width, the cross-sectional area and/or the diameter of the respective object stream.

In one exemplary embodiment, the first and/or the second extent information is representative of a diameter of the respective object stream. For example, the respective extent information is a diameter of the respective object stream. For example, the diameter is along a specific axis or the central diameter.

In one exemplary embodiment, the method also comprises determining a first ratio of the surface to the diameter of the first object stream on the basis of the first surface information and the first extent information, determining a second ratio of the surface to the diameter of the second object stream on the basis of the second surface information and the second extent information, wherein the adjustment of the first speed of the first conveyor and/or the adjustment of the second speed of the second conveyor is based on the determined first ratio and on the determined second ratio.

As a result of the fact that adjustment of the first speed and/or of the second speed is additionally based on the determined first and/or second described ratios, the adjustment of the speed can be optimized further and therefore the throughput rate of a conveyor system can ultimately be increased further. It has become apparent here that the use of the ratio of the surface with respect to the diameter of an object stream can be advantageously used as an input value for performing open-loop or closed-loop control of the respective speed of the conveyor, in order to achieve an increased throughput rate.

The adjustment of the respective speed on the basis of the determined first ratio and on the basis of the determined second ratio can advantageously constitute a regulating process. By contrast, the already described adjustment of the respective speed on the basis of the determined first surface information and the determined second surface information can constitute a condition which is to be complied with during the regulating process.

In one exemplary embodiment, the adjustment of the first speed and/or the adjustment of the second speed is based on a comparison of the surface of the second object stream with the surface of the first object stream. For example, the adjustment of the first speed and/or the adjustment of the second speed is influenced by the fact that it is determined whether the surface of the second object stream changes in comparison with the surface of the first object stream, in particular becomes larger.

If it is determined, for example, that the surface increases from the first to the second object stream (sufficiently), this can be considered to be a sign that the objects are (sufficiently) separated. The first and/or the second speeds can then be adjusted in such a way that a supply of objects from the first object stream into the second object stream can continue to take place. For example, the speeds are maintained. If, on the other hand, it is determined, for example, that the surface does not become larger from the first to the second object stream (or not sufficiently), this can be considered to be a sign that the objects are not separated (or not sufficiently). The first and/or the second speeds can then be adjusted in such a way that a supply of objects from the first object stream into the second object stream is (temporarily) reduced or prevented. For example, it is conceivable that the difference in speed is increased, in particular while maintaining the ratio of the first speed with respect to the second speed. For example, the first speed can be reduced for this purpose. It is also conceivable for the second speed to be increased.

Determining whether the surface becomes larger can be detected, for example, by virtue of the fact that the sizes of the respective surfaces themselves are compared. However, on the one hand it is also conceivable for the roughness of the surfaces to be compared, wherein when there is an increase in the roughness, an increase in the size of the surface can be inferred. The roughness may be derived, for example, on the basis of a frequency spectrum from an envelope curve describing the respective object stream.

In one exemplary embodiment, the adjustment of the first speed and/or the adjustment of the second speed is based on a comparison of the ratio of the surface with respect to the diameter of the first object stream with the ratio of the surface with respect to the diameter of the second object stream. For example, the adjustment of the first speed and/or the adjustment of the second speed are/is influenced by virtue of the fact that it is determined whether the ratio of the surface with respect to the diameter of the first object stream changes in comparison with the ratio of the surface with respect to the diameter of the second object stream, in particular becomes smaller.

The respective ratio of the surface with respect to the diameter can be advantageously obtained here from the already described surface information and the already described extent information.

In one exemplary embodiment, the first geometry information comprises first height information, in particular a height profile, of the first object stream, and/or the second geometry information comprises second height information, in particular a height profile, of the second object stream. For example, the height information of the first object stream is representative of the height of the object stream, while the height information of the second object stream can be in particular representative of the height of individual objects of the object stream owing to separation of the objects which in an optimum case has already taken place.

In one exemplary embodiment, the first extent information is representative of a width of the first object stream, and/or the second extent information is representative of a width of the second object stream. For example, the extent information which is representative of the width of the respective object stream can be determined from the height information, in particular the height profile. In this way it is possible, for example, to derive both the height and the width of the object stream from a height profile transversely with respect to the direction of transportation. From this information it is possible to derive, in particular, the cross-sectional area of the respective object stream. As already stated, it is also conceivable that the extent information is representative of the cross-sectional area of the corresponding object stream.

In one exemplary embodiment, the adjustment of the first speed of the first conveyor and/or an adjustment of the second speed of the second conveyor is based on the first height information of the first object stream and/or the first extent information which is representative of a width of the first object stream. As already stated, it is possible here to capture, for example, geometry information which comprises a height profile from which both the height and the width (and therefore the cross-sectional area) of the corresponding object stream can be determined. It is also conceivable that an extent information item which is representative of the cross-sectional area of the object stream is determined on the basis of the height information, for example a height profile, and the adjustment of the respective speed is based thereon.

This is based on the idea that it can be assumed that a volume flow V' of an object stream (e.g. of the first or second object stream) arises from the width B, the height H and the speed v of the corresponding object stream $$V'=B \cdot H \cdot v$$

The volume flow can also be described as a product of the throughput rate Q of the individual objects and the volume $V_n$ of an object of the object stream $$V'=Q \cdot V_n$$

Therefore, the speed can be expressed as $$v=Q \cdot V_n/(B \cdot H) \quad (1)$$

The one speed (for example the first speed) can therefore be adjusted on the basis of the determined (first) geometry information, for example the height H and the width B or the cross-sectional area B·H.

In one exemplary embodiment, the adjustment of the first speed of the first conveyor and/or the adjustment of the second speed of the second conveyor is based on an assumption of a size of one or more objects of the first object stream. In particular, an assumption of a size of the objects can be an assumption or supposition regarding the dimensions or volume of the objects. This assumption can be checked later when there is sufficient separation of the objects. As a result of the assumption of a size of one or more objects, an assumption about $V_n$ can be made in the above expression (1) without having to measure $V_n$.

In one exemplary embodiment, the adjustment of the first speed of the first conveyor and/or the adjustment of the second speed of the second conveyor is based on a requested throughput rate of the objects. A requested throughput rate is, for example, the number of objects per unit of time, for example the number of packaged items per minute. Including a requested throughput rate permits the speed v to be determined as a function of the size Q in the above expression (1).

In one exemplary embodiment, the second geometry information comprises size information of one or more objects of the second object stream. The previously made assumption about the size of one or more objects can be verified by means of the size information. This is possible since the objects in the second object stream are sufficiently separated and corresponding size information can be obtained by means of the determined second geometry information.

In addition, in the above expression (1) $V_n$ can be replaced by $$V_n=a \cdot b \cdot h,$$

where the length of an object is a, the width is b and the height is h. Assuming that the second object stream is a 2D bulk, that is to say has only one object layer, H=h, with the result that the following is obtained for the speed $$v=Q \cdot a \cdot b/B.$$

Therefore, the first and/or the second speeds can be adjusted, in particular, on the basis of the object dimensions and/or a requested throughput rate. Likewise, the first and/or the second speeds can be adjusted, in particular, on the basis of a requested gap distribution in the second object stream.

In one exemplary embodiment, the method also comprises determining information which is representative of surface coverage of the first and/or second conveyor. This can serve to check a desired area coverage. For example, if the area coverage does not correspond to the desired area coverage, adjustment of the first and/or second speeds can be influenced.

For example, an average height of the first and/or second object streams can be additionally determined. In particular, a comparison of the average height of the first and of the second object streams can take place. If the average height does not change, or does not change sufficiently, from the first to the second object stream, it can be inferred that sufficient separation does not take place. If the average height decreases from the first to the second object stream (sufficiently), it is possible, on the other hand, to infer (sufficient) separation. Such a comparison can also influence adjustment of the first and/or the second speeds.

In one exemplary embodiment, the method also comprises determining a throughput rate of the objects. As already stated, a throughput rate can be understood to be, in particular, a number of objects per unit of time. The throughput rate is preferably determined after the movement onto the second conveyor. For example, the throughput rate can also be determined after the second conveyor.

In one exemplary embodiment, the ratio of the first speed of the first conveyor with respect to the second speed of the second conveyor remains essentially constant. The first and the second speeds are adjusted in such a way that a constant ratio of the first speed of the first conveyor with respect to the second speed of the second conveyor is obtained. An essentially constant ratio is understood as meaning that, for example, a deviation of 5% from a predefined speed is tolerated.

In one exemplary embodiment, the ratio of the first speed of the first conveyor with respect to the second speed of the second conveyor is between 1:1.5 and 1:3, is preferably essentially 1:2. It has become apparent that a ratio in this range permits efficient use of a conveyor system and, in particular, permits optimization of the throughput rate.

In one exemplary embodiment, the adjustment of the first and/or second speeds is based on a calculation and/or a conversion table. If the adjustment of the speed is based on a calculation, it can be adjusted precisely for any cases. If the adjustment of the speed is based on a conversion table, the speed can be determined on the basis of stored parameters. In particular, parameters can be stored in the conversion table as a function of various object categories (for example object sizes).

In one exemplary embodiment, the adjustment of the first and/or second speed selectively adjusts a distance distribution between the objects of the second object stream. It has become apparent that in particular the distance or gap distribution between the objects is relevant for the throughput rate of a conveyor system. In this context, not only excessively large distances or gaps but also excessively small distances or gaps between the objects are disadvantageous.

In one exemplary embodiment, the first and/or the second speed is adjusted in such a way that the distance between two adjacent objects, respectively, of the second object stream for a majority of the objects is between 0.5 m and 7 m, preferably between 1 m and 6 m, particularly preferably between 1.2 m and 5 m. A majority of the objects is understood to be, in particular, more than 50%, preferably more than 70% and particularly preferably more than 90% of the objects. For example, the distance between two respective adjacent objects of the second object stream is in the respective range in each case or on average.

In one exemplary embodiment, the first conveyor and the second conveyor are arranged directly one behind the other. In particular, no further conveyor is arranged between the first and second conveyor. However, further conveyor can be provided before the first conveyor and/or after the second conveyor.

In one exemplary embodiment, the first conveyor and the second conveyor each comprise a conveyor belt or are embodied as such. However, it is basically also conceivable for other conveyor whose speed can be adjusted to be provided (for example roller conveyors).

In one exemplary embodiment, the objects are packaged items, and the first object stream and the second object stream are each a stream of packaged items.

Further advantageous exemplary refinements of the invention can be found in the following detailed description of a number of exemplary embodiments of the present invention, in particular in conjunction with the figures. However, the figures should serve not only for the purpose of clarification but also for determining the scope of protection of the invention. The figures are not true to scale and are intended merely to reflect by way of example the general concept of the present invention. In particular, features which are contained in the figures are not to be considered in any way as absolutely necessary parts of the present invention.

BRIEF DESCRIPTION OF THE SEVERAL VIEWS OF THE DRAWING

In the figures:

FIG. 3 shows a flowchart with method steps of an exemplary second embodiment of the method according to the invention.

DETAILED DESCRIPTION OF A NUMBER OF EXEMPLARY EMBODIMENTS OF THE INVENTION

The present invention will be described below with reference to exemplary embodiments which permit advantageous singulation and therefore a high throughput rate of packaged items.

Figure 1:
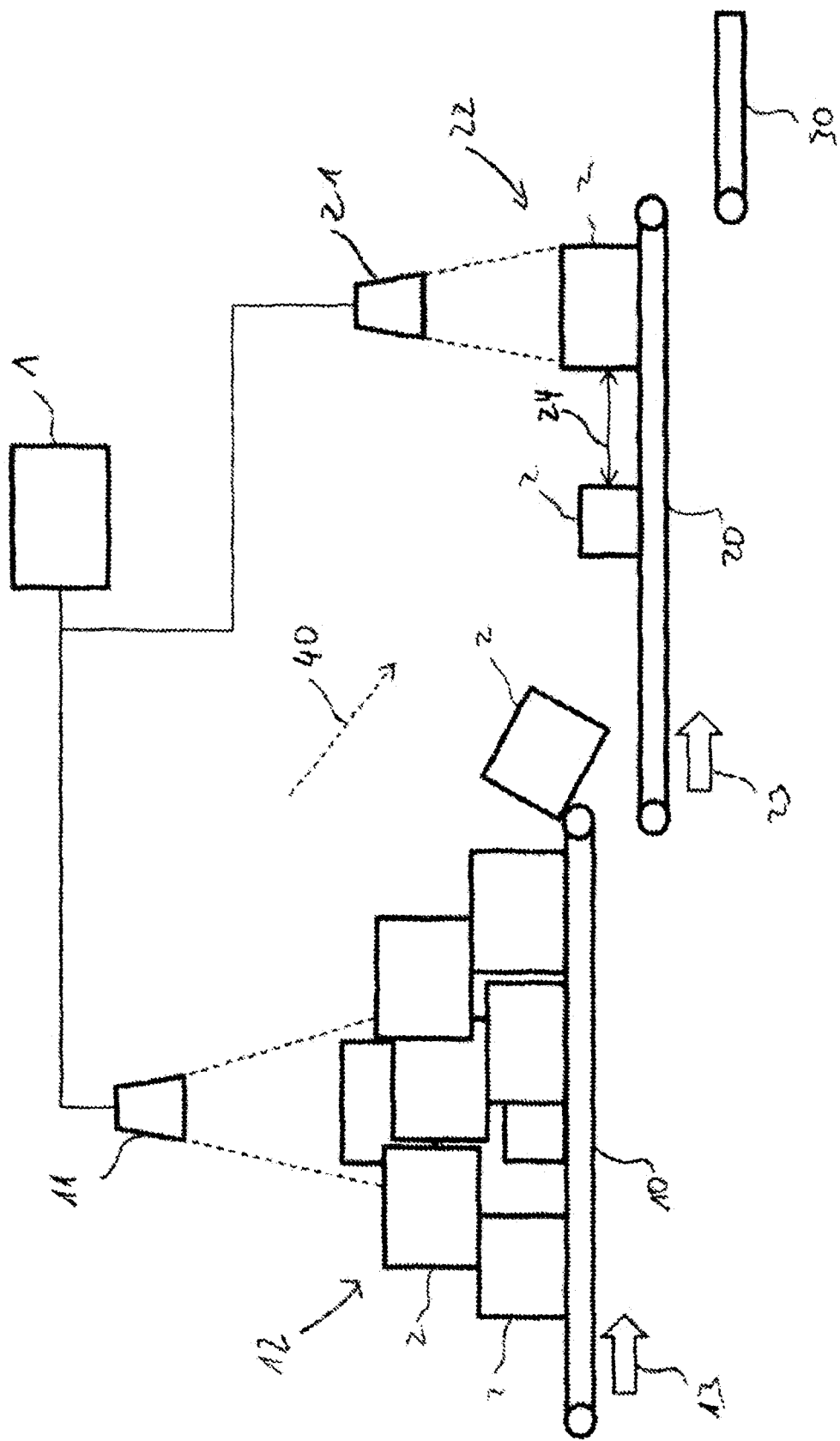
FIG. 1 shows a schematic illustration of an exemplary embodiment of a system according to the invention.

FIG. 1 shows an exemplary embodiment of a system according to the invention. The system comprises a control apparatus 1, for example an open-loop or closed-loop control apparatus. In addition, the system comprises a first conveyor 10 and a second conveyor 20 of a conveyor system. In addition, the system comprises capture devices 11, 12 which are embodied as sensors and are arranged in order to determine first and second geometry information.

The control apparatus 1 is an exemplary embodiment of an apparatus according to the invention. The control apparatus 1 can be a special apparatus or a correspondingly configured conventional computer or server. The control apparatus 1 comprises a processor, a program memory, a working memory, a user interface and various communication interfaces. The processor is connected to each of these components.

The program memory is a non-volatile memory which stores computer programs with program instructions. It can additionally store parameters and other data. The processor is configured to read out program instructions from the program memory and perform them. The working memory can be a volatile memory which can be used by the processor to buffer program instructions and data.

The user interface can have any desired input element and output element such as, for example, a screen, if appropriate with a touchscreen, loudspeaker, a keyboard and/or knobs, etc. The user interface can be provided for maintenance purposes, optimization purposes and operational purposes.

The communication interfaces can comprise at least one interface for a connection to the capture devices 11, 21 and at least one interface for a connection to the conveyor 10, 20. All the interfaces can be wire-bound or wireless. An interface for wireless connection—e.g. a WLAN interface—could also be used for all the wireless connections which are provided, while utilizing different channels. The control apparatus 1 can comprise various further components, for example a further memory in which predefined values of an operator and other data can be stored. The control apparatus 1 can be specifically assigned to the conveyor 10, 20 or else other conveyor of the conveyor system. In that case, interfaces are present for communication with the further conveyor and possible sensor.

The conveyor 10, 20 are embodied here in each case as a conveyor belt and are arranged directly one behind the other. The conveyor system can also comprise further conveyor, for example the partially illustrated conveyor belt 30.

A first object stream in the form of a stream 12 of packaged items comprising a plurality of objects in the form of packaged items 2 is transported at a first speed on the first conveyor belt 10, which is indicated by the arrow 13. A second stream 22 of packaged items comprising a plurality of packaged items 2 is transported at a second speed on the second conveyor belt 20, which is indicated by the arrow 23.

The first stream 12 of packaged items comprises here packaged items 2 which are transported at least partially both one on the other and one next to the other in 3D bulk on the first conveyor belt 10.

The packaged items 2 of the first stream 12 of packaged items are transported to one end of the first conveyor belt 10. In this context, the packaged items 2 drop onto the second conveyor belt 20 at the end of the first conveyor belt 10, as indicated by the arrow 40.

The first conveyor belt 10 and the second conveyor belt 20 are arranged here in such a way that the packaged items 2 which are transported one on the other in the first stream 12 of packaged items on the first conveyor belt 10 are distributed by the dropping (arrow 40) onto the second conveyor belt 20 such that at least some of the packaged items which were previously transported one on the other in the first stream 12 of packaged items are no longer transported one on the other in the second stream 22 of packaged items on the second conveyor belt 20. Instead, in the second stream 22 of packaged items, the packaged items 12 are essentially transported one next to the other and one behind the other as 2D bulk on the second conveyor belt 20.

In order to achieve advantageous distribution of the packaged items on the second conveyor belt 20 (and during the further transportation of the packaged items 2) and therefore an increased throughput rate of the conveyor system, the system can implement exemplary embodiments of the method according to the invention.

Figure 2:
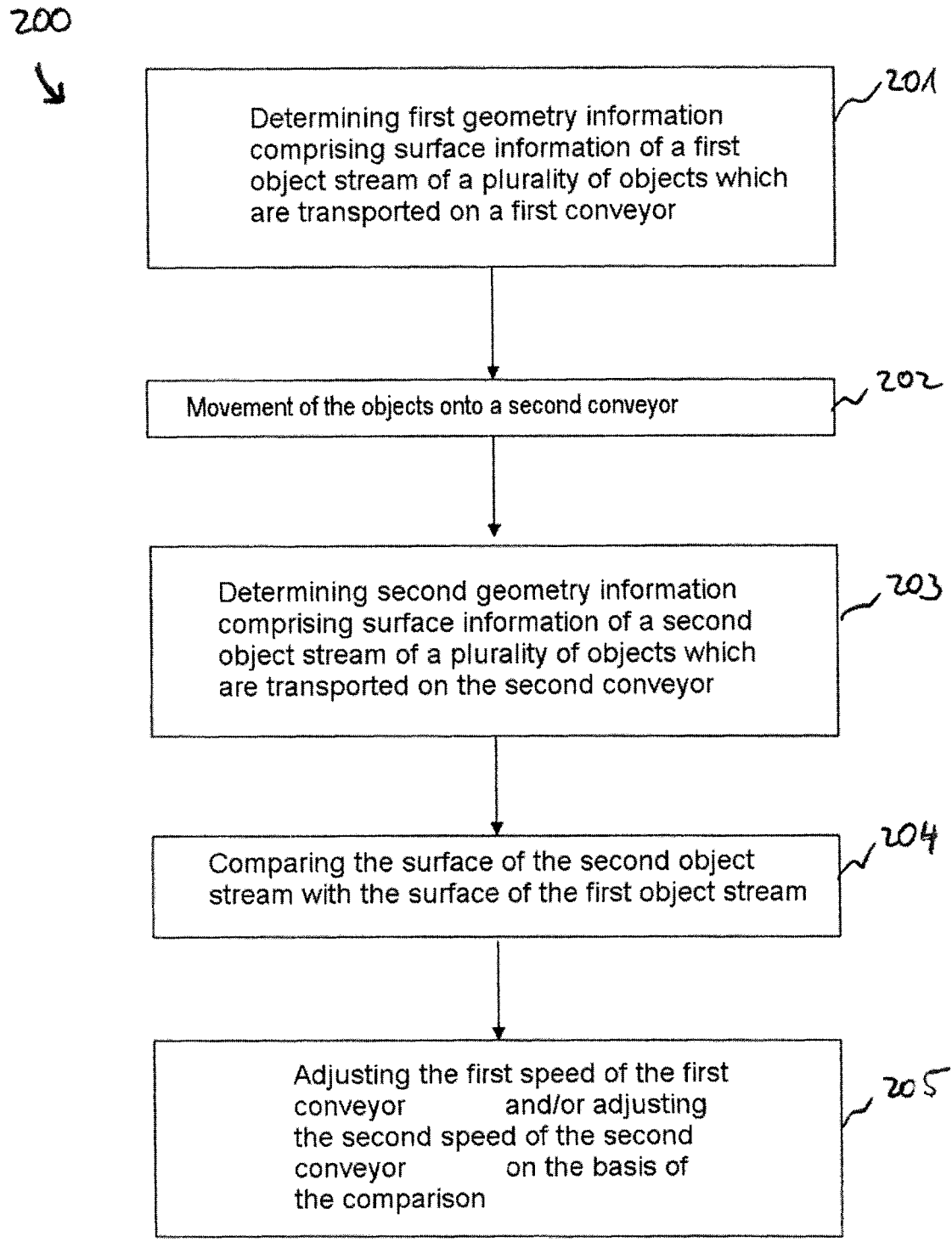
FIG. 2 shows a flowchart with method steps of an exemplary embodiment of the method according to the invention.

FIG. 2 shows a flowchart 200 with method steps 201-205 of an exemplary embodiment of the method according to the invention.

By using the sensor 11, the apparatus 1 can determine first geometry information, in particular a measure of the size of the surface of the first stream 12 of packaged items (action 201). Subsequently, the parcels move onto the second conveyor 20 (action 202).

By using the sensor 21, the apparatus 1 can determine second geometry information, in particular a measure of the size of the surface of the second stream 22 of packaged items (action 203).

On this basis, it is possible to determine, in particular by comparison, whether the surface of the second stream 22 of packaged items becomes larger in comparison with the surface of the first stream 12 of packaged items (action 204).

On the basis of the change in the surface from the first stream 12 of packaged items to the second stream 22 of packaged items, the first speed 13 of the first conveyor belt 10 and/or the second speed 23 of the second conveyor belt 20 can now be adjusted (action 205).

It has become apparent that a gap distribution between the packaged items 2 of the second stream 22 of packaged items can be adjusted selectively by adjusting the first and/or the second speeds 13, 23 on the basis of these input variables. The distance 24 between two respective adjacent packaged items 2 of the second stream 22 of packaged items is, for example, preferably between 1.2 m and 5 m for the packaged items.

It has become apparent that the throughput rate drops, in particular, when too many packaged items are transported with a gap of less than 1.2 m. If the distance between the packaged items is adjusted to a region between 1.2 m and 5 m, an increase in the throughput rate can be achieved.

FIG. 3 shows a flowchart 300 with method steps 301-305 of an exemplary second embodiment of the method according to the invention.

By using the sensor 11, the apparatus 1 firstly determines first geometry information comprising a height profile of the first stream 12 of packaged items (action 301).

On the basis of the relationship $v = Q \cdot V_n / (B \cdot H)$ it is now possible to adjust the first speed 13 of the first conveyor belt 10 and/or the second speed 23 of the second conveyor belt 20 (action 302) by means of the determined height profile, in particular the width and height, that is to say the cross-sectional area B·H of the stream 12 of packaged items and an assumption for the volume $V_n$ of a packaged item 2 as a function of the requested throughput rate Q.

The parcels subsequently move onto the second conveyor 20 (action 303).

By using the sensor 21, the apparatus 1 determines second geometry information comprising a height profile of the second stream 22 of packaged items (action 204).

Owing to the separation which has taken place, the height profile can also be used to determine size information of individual packaged items, with the result that, in particular, the assumption for $V_n$ can be checked.

Where necessary, insofar as, for example, the assumption for $V_n$ is corrected, it is then possible to adjust the first speed 13 of the first conveyor belt 10 and/or to adjust the second speed 23 of the second conveyor belt 20 again on the basis of the first and second geometry information (action 205).

Furthermore, further optional method steps such as, for example, determining information which is representative of area coverage of the first and/or second conveyor belt or determining a throughput rate of the packaged items can be implemented.

The methods which are presented by way of example can be modified in a variety of ways within the scope of the invention, both by adding actions, by omitting actions and by modifying actions. This can respectively result in further advantages. The sequence of the described actions in the flowchart is also not compulsory; alternative sequences are conceivable. Finally, the actions can be implemented in a variety of ways.

Of course, the described embodiments are generally only examples which can be modified and/or added to in a variety of ways within the scope of the claims. In particular, any feature which has been described for a specific exemplary embodiment can be used independently or in combination with other features in any other exemplary embodiment. Any feature which has been described for an exemplary embodiment of a specific category can also be used in a corresponding way in an exemplary embodiment of another category.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
    determining first geometry information of a first object stream of a plurality of objects, which are transported on a first conveyor; and
    determining second geometry information of a second object stream of a plurality of objects which are transported on a second conveyor;
    wherein the first conveyor is configured to transport objects at a first speed, and the second conveyor is configured to transport objects at a second speed,
    wherein the first conveyor and the second conveyor are arranged in such a way that the objects which are transported by the first conveyor move onto the second conveyor;
    wherein the method comprises adjusting the first speed of the first conveyor and/or adjusting the second speed of the second conveyor on the basis of the determined first geometry information and/or the determined second geometry information; and
    wherein the first geometry information comprises first height information, in particular a height profile, of the first object stream, and/or in that the second geometry information comprises second height information, in particular a height profile, of the second object stream.

2. The method according to claim 1, wherein the first conveyor is configured to transport the objects of the first object stream to one end of the first conveyor, and the objects move on to the second conveyor at the end of the first conveyor.

3. The method according to claim 1, wherein the first object stream comprises objects which are transported at least partially one on the other and/or one next to the other on the first conveyor.

4. The method according to claim 1, wherein the first conveyor and the second conveyor are arranged in such a way that objects which are transported one on the other in the first object stream on the first conveyor can be distributed by the movement onto the second conveyor in such a way that these objects which were previously transported one on the other in the first object stream are at least partially no longer transported one on the other in the second object stream on the second conveyor.

5. The method according to claim 1, wherein in the second object stream the objects are transported essentially one next to the other and/or one behind the other on the second conveyor.

6. The method according to claim 1, wherein the first geometry information comprises first surface information which is, in particular, representative of a size of the surface of the first object stream, and/or in that the second geometry information comprises second surface information which is, in particular, representative of a size of the surface of the second object stream.

7. The method according to claim 1, wherein the first geometry information comprises first extent information of the first object stream, and/or in that the second geometry information comprises second extent information of the second object stream.

8. The method according to claim 6, wherein the method also comprises:
    determining a first ratio of the surface to the diameter of the first object stream on the basis of the first surface information and the first extent information;
    determining a second ratio of the surface to the diameter of the second object stream on the basis of the second surface information and the second extent information; and
    wherein the adjustment of the first speed of the first conveyor and/or the adjustment of the second speed of the second conveyor is based on the determined first ratio and on the determined second ratio.

9. The method according to claim 6, wherein the adjustment of the first speed and/or the adjustment of the second speed is based on a comparison of the surface of the second object stream with the surface of the first object stream.

10. The method according to claim 8, wherein the adjustment of the first speed and/or the adjustment of the second speed is based on a comparison of the ratio of the surface with respect to the diameter of the first object stream with the ratio of the surface with respect to the diameter of the second object stream.

11. The method according to claim 1, wherein the adjustment of the first speed of the first conveyor and/or an adjustment of the second speed of the second conveyor is based on the first height information of the first object stream and/or the first extent information which is representative of a width of the first object stream.

12. The method according to claim 1, wherein the adjustment of the first speed of the first conveyor and/or the adjustment of the second speed of the second conveyor is based on an assumption of a size of one or more objects of the first object stream.

13. The method according to claim 1, wherein the adjustment of the first speed of the first conveyor and/or the adjustment of the second speed of the second conveyor is based on a requested throughput rate of the objects.

14. The method according to claim 1, wherein the method also comprises:
determining information which is representative of surface coverage of the first and/or second conveyor.

15. The method according to claim 1, wherein the ratio of the first speed of the first conveyor with respect to the second speed of the second conveyor remains essentially constant.

16. The method according to claim 1, wherein the ratio of the first speed of the first conveyor with respect to the second speed of the second conveyor is between 1:1.5 and 1:3.

17. The method according to claim 1, wherein the adjustment of the first and/or second speed selectively adjusts a distance distribution between the objects of the second object stream.

18. The method according to claim 1, wherein the first and/or the second speed is adjusted in such a way that the distance between two adjacent objects, respectively, of the second object stream for a majority of the objects is between 0.5 m and 7 m.

19. The method according to claim 1, wherein the objects are packaged items, and the first object stream and the second object stream are each a stream of packaged items.

20. The method according to claim 1, wherein the ratio of the first speed of the first conveyor with respect to the second speed of the second conveyor is essentially 1.2.

21. The method according to claim 1, wherein the first and or the second speed is adjusted in such a way that the distance between two adjacent objects, respectively, of the second object stream for a majority of the objects is between 1 m and 6 m.

22. The method according to claim 1, wherein the first and/or second speed is adjusted in such a way that the distance between two adjacent objects, respectively, of the second object stream for a majority of the objects is particularly between 1.2 m and 5 m.

23. An apparatus, comprising:
at least one processor; and
at least one memory including computer program code, the at least one memory and the computer program code configured to,
with the at least one processor, cause the apparatus to perform at least the following:
determine first geometry information of a first object stream of a plurality of objects, which are transported on a first conveyor;
determine second geometry information of a second object stream of a plurality of objects which are transported on a second conveyor; wherein the first conveyor is configured to transport objects at a first speed, and the second conveyor is configured to transport objects at a second speed, wherein the first conveyor and the second conveyor are arranged in such a way that the objects which are transported by the first conveyor move onto the second conveyor;
and
wherein the at least one memory and the computer program code are further configured to, with the at least one processor, cause the apparatus to perform adjusting the first speed of the first conveyor and/or adjusting the second speed of the second conveyor on the basis of the determined first geometry information and/or the determined second geometry information, wherein the first geometry information comprises first height information, in particular a height profile, of the first object stream, and/or the second geometry information comprises second height information, in particular a height profile, of the second object stream.

24. A non-transitory computer-readable medium encoded with instructions that, when executed by a computer, perform:
determining first geometry information of a first object stream of a plurality of objects, which are transported on a first conveyor;
determining second geometry information of a second object stream of a plurality of objects which are transported on a second conveyor; wherein the first conveyor is configured to transport objects at a first speed, and the second conveyor is configured to transport objects at a second speed, wherein the first conveyor and the second conveyor are arranged in such a way that the objects which are transported by the first conveyor move onto the second conveyor;
and
adjusting the first speed of the first conveyor and/or adjusting the second speed of the second conveyor on the basis of the determined first geometry information and/or the determined second geometry information, wherein the first geometry information comprises first height information, in particular a height profile, of the first object stream, and/or the second geometry information comprises second height information, in particular a height profile, of the second object stream.

* * * * *